: 2,871,201
Patented Jan. 27, 1959

2,871,201

HYDROCARBON CONVERSION CATALYSTS

Thomas F. Doumani, Whittier, Calif., assignor to Union Oil Company of California, Los Angeles, Calif., a corporation of California No Drawing. Original application July 6, 1951, Serial No. 235,579. Divided and this application August 22, 1955, Serial No. 529,938

3 Claims. (Cl. 252—440)

This invention relates generally to catalysts and catalytic processes for the conversion of hydrocarbons and hydrocarbon mixtures. More particularly this invention relates to new and improved methods for the preparation of molybdenum-containing catalysts and especially to the incorporation of certain metal sulfates in molybdenum catalysts for use in the catalytic conversion of hydrocarbons in the presence of hydrogen.

Catalysts for the high temperature catalytic conversion of hydrocarbons should generally lay down a minimum of carbonaceous deposits on the catalyst during reaction. The formation of catalytic coke is undesirable since it generally leads to decreased liquid recoveries, unnecessary consumption and/or contamination of the recycle hydrogen stream and to short on-stream reaction cycles between regenerations. Molybdenum oxide catalysts are particularly prone to lay down large amounts of carbon during conversions and consequently molybdenum oxide catalysts require frequent regeneration. Molybdenum sulfide catalysts also suffer this disadvantage but to a lesser degree. The withdrawal of catalysts from reaction for purposes of regeneration contributes to decreased throughput of feed stock per unit volume of catalyst and often entails extensive cycle systems for frequent periodic regeneration.

It has been found that the inclusion of sulfate such as metal sulfate in molybdenum catalysts increases the selectivity of the catalyst for the desired reactions. It has also been found that the activity of the molybdenum-sulfate type catalyst can be increased by impregnation with inorganic halogen-containing acids. The effect of the halogen acid is obtained when either the catalyst is impregnated or when the carrier is impregnated with the acid.

It is therefore an object of this invention to provide molybdenum-containing catalysts for the catalytic conversion of hydrocarbons which produce a minimum of carbon deposition and a minimum of destructive hydrogenation.

It is another object of this invention to promote supported molybdenum catalysts for use in hydrocarbon conversion reactions so as to increase the hydrogen production and decrease carbon lay down on the catalyst.

It is another object of this invention to provide a process for the catalytic upgrading of gasoline in the presence of supported molybdenum catalysts promoted with certain metal sulfates.

It is another object of this invention to promote cobalt molybdate type catalysts with certain metal sulfates so as to decrease splitting reactions and increase hydrogenation and dehydrogenation reactions.

It is another object of this invention to promote molybdenum catalysts with sulfates and inorganic halogen containing acids.

Other objects and advantages of this invention will become apparent to those skilled in the art as the description thereof proceeds.

Briefly this invention relates to the preparation and use of molybdenum containing supported catalysts which are promoted with certain metallic sulfates wherein the presence of the sulfate moderates the destructive hydrogenation characteristics of the molybdenum catalyst. Such catalysts may or may not contain added metal oxides such as cobalt oxide, iron oxide, nickel oxide, copper oxide, zinc oxide, cadmium oxide and the like, or sulfides of any of the foregoing metals in addition to the metallic sulfate.

The metal oxides and/or sulfides or metals which may be incorporated with molybdenum oxides and/or sulfides and promoted with metal sulfates or metal sulfates and inorganic halogen-containing acids include the oxides and/or sulfides of metals, having an atomic number of or greater than 22 and particularly those metals having an atomic number in the group 22 to 58.

The metal sulfates which are most generally useful are those of divalent metals having an atomic number of 22 or more and particularly those metals having an atomic number in the group 22 to 58. As examples of metal sulfates which exert a promoting action, the following may be employed: titanium, vanadium, chromium, manganese, iron, cobalt, nickel, copper, zinc, strontium, zirconium, ruthenium, rhodium, palladium, silver, cadmium, tin, barium, cerium, platinum, thorium and uranium. Ammonium sulfate and sulfric acid may also be employed to introduce sulfate into molybdenum catalysts. The sulfates of the three divalent metals of atomic number less than 22, i. e. beryllium, magnesium and calcium, are useful also, especially in catalysts to be employed for dehydrogenation reactions.

The molybdenum and the metal sulfate may be incorporated into the catalyst in a number of ways such as impregnation, coprecipitation, mixing of the hydrous gels or precipitation in the presence of a hydrous gel. Thus molybdenum oxides and/or sulfides may be coprecipitated with a carrier such as alumina and the sulfate thereafter incorporated either by precipitation therewith or by impregnation. In the preferred method of catalyst preparation the molybdenum is supported on the carrier by impregnation and the metal sulfate, provided such sulfate is soluble, is also introduced into the carrier by impregnation. In one modification of the invention the molybdenum and the metal sulfate may be simultaneously introduced by coimpregnation.

The carriers which are suitable for distending molybdenum and metal sulfates according to the process of this invention include ferric oxide, stannic oxide, alumina, silica, zirconia, thoria, magnesia, magnesium hydroxide, titania and the like, or combinations of these. The preferred carrier is an activated gel type alumina and particularly an alumina gel containing about 1 to 15% by weight of silica and preferably between about 3 and 8% by weight of silica. The presence of the small amount of silica in the alumina serves to stabilize the resulting catalyst and prolongs the catalyst life as is described in U. S. Patent 2,437,532 to H. C. Huffman.

Prior to the impregnation steps, the carrier is normally shaped into the physical form desired for the catalyst. For this purpose the dried carrier is usually ground, mixed with a lubricant such as graphite or hydrogenated vegetable oil, and pilled. In the activation of the carrier by heating the lubricant is removed by combustion. Alternatively the carrier may be used in granular form; or it may be ground into powder, made into a paste and extruded. Where the catalyst is to be employed in a fluidized process, such as in fluidized desulfurization, denitrogenation, and the like, the carrier is formed into a finely divided state as in micro-bead form, or it is ground into a fine state and is thereafter impregnated. In the case of fluidized processes the carrier can be impregnated in larger form, e. g. granules, pills, etc., and thereafter ground to the desired powder size for the processing.

In the preferred method of catalyst preparation the molybdenum together with any additional metal oxides is impregnated on the carrier prior to impregnation with the metal sulfate. In other modifications of the invention however, the metal sulfate may be deposited either before or during the impregnation of the molybdenum oxide, sulfide or other compound as well as after. Where the catalyst is further promoted with a halogen-containing acid, such acid may also be impregnated either before, during or after the impregnation of the molybdenum and/or metal sulfate. Where coprecipitation or the like is employed for the deposition of molybdenum and/or other metal oxides or sulfides the metal sulfate is preferably impregnated on such catalyst after drying and after sufficient heating to render the catalyst adsorbent.

In the preparation of a carrier and/or a carrier containing molybdenum and/or other metal oxides or sulfides and/or inorganic halogen-containing acids for impregnation, the carrier is heated to a temperature sufficient to render it adsorbent for the impregnation step. Normally such heating is effected for two to six hours at 600° F. to 1200° F. for example. Activation temperatures as low as about 300° F. may be employed without difficulty however. Following the activation the carrier is cooled and is thereafter immersed in the appropriate impregnation solution.

The molybdenum-containing impregnation solution is preferably ammoniacal ammonium molybdate although aqueous solutions of other soluble molybdenum compounds may be employed. In the preferred method, ammonium paramolybdate is dissolved in about 14% aqueous ammonia and the resulting mixture is diluted with distilled water or with more diluted aqueous ammonia to form a clear ammonium molybdate solution of the desired concentration. The concentration of the ammonium molybdate solution will depend on the particular carrier being employed and on the desired concentration of molybdenum in the finished catalyst. Where alumina or alumina-silica carriers are employed, and a finished catalyst comprising between about 6% to 16% of $MoO_3$ is desired, the molybdenum-containing impregnation solutions will have a concentration of molybdenum ranging from about 12 to 32 grams of $MoO_3$/100 ml.

Molybdenum-containing impregnation solutions may be prepared from other soluble molybdenum salts. Thus an ammonium sulfomolybdate solution may be prepared by dissolving ammonium molybdate in an ammonium sulfide solution. The molybdenum obtained by impregnation with such solution is obtained as a molybdenum sulfide after heating to remove the ammonia.

Other metal salts may be impregnated either before, after or with the molybdenum. In one modification of the invention the molybdenum and cobalt may be combined and deposited on the carrier according to the method described in U. S. Patent 2,486,361 to Paul G. Nahin. The preferred metal oxides and/or sulfides for use in conjunction with molybdenum oxide or sulfide include the oxides and/or sulfides of iron, nickel and cobalt. Of these materials the cobalt oxide is preferred.

The cobalt-containing impregation solution is preferably an aqueous solution of cobaltous nitrate although other water-soluble compounds of cobalt may be employed. Thus cobalt chloride and cobalt sulfate may be employed in the impregnation solutions. The concentration of the cobalt-containing impregnation solution will depend upon the carrier being employed and the desired concentration of cobalt in the finished catalyst. Where alumina or alumina-silica carriers are employed and where a final catalyst composition containing from about 2% to 10% by weight of CoO is desired, the concentration of the cobalt impregnation solution will range from about 4 to 23 grams of CoO/100 ml.

In the impregation of the carrier the activated carrier is immersed in the impregation solution for a short time such as between about two minutes and 60 minutes for example. A more uniform impregnation is obtained with longer impregnation periods.

After immersion in the impregnation solution a part of the impregnation solution is adsorbed by the carrier and the excess solution is thereafter removed. The impregnated carrier after draining and drying in a low temperature oven such as at 180° F. to 230° F., for example, is finally activated by heating to a temperature of 600° F. to 1000° F. for two to six hours. The final activation may be carried out by bringing the dried impregnated carrier to the required reaction temperature.

In the case where multiple impregnations are employed such as for the incorporation of other metal oxides and/or inorganic halogen-containing acids in addition to the molybdenum, any component may be deposited first and the impregnated carrier after drying is reactivated as described hereinbefore for the subsequent impregnation of the remaining component and/or components.

Many of the metallic sulfates which are useful in this invention are water-soluble and accordingly the impregnation solution may be prepared by dissolving the appropriate metal sulfate in water. The concentration of the metal sulfate solution will depend upon the particular carrier being employed and the desired concentrations of the metal and sulfate in the finished catalyst. Where a finished catalyst comprising between about 1% and 25% of the metal sulfate is desired, the impregnation solution will contain between about 2 and 60 grams of metal sulfate per 100 ml. of solution.

The molybdenum-sulfate type catalysts of this invention with or without other metal oxides and/or sulfides may be further promoted by impregnation of either the carrier or the catalyst with an inorganic halogen-containing acid. The acid may be impregnated before, during or after the impregnation of any of the other components. Preferably the acid is impregnated on the finished catalyst containing the molybdenum and the sulfate however.

The acid impregnation solution according to the method of this invention may be prepared from fluorine-containing inorganic acids such as hydrofluoric acid, fluorosulfonic acid and fluorosilicic acid and the like. Where chlorine-containing acids are employed, hydrochloric acid, chlorosulfonic acid and the like may be employed.

In general the fluorine or chlorine retained by the carrier varies directly with the concentration of the impregnating solution. With the use of alumina carriers it has been found that the preparation of catalysts containing between 0.2% and 5% by weight of fluorine or chlorine required impregnating solutions containing between about 0.4 and 10.4 grams of fluorine (as F) or chlorine (as Cl) per 100 ml. of solution.

While other concentrations of fluorine or chlorine may sometimes be employed, we generally employ between about 0.05% and 5% of fluorine or chlorine and we prefer to employ between about 0.2% and 3% of fluorine or chlorine based upon the finished catalyst.

In the simplest modification of the invention the carrier or the carrier supporting the molybdenum is impregnated with an aqueous metal sulfate. However in other modifications of the invention derivatives of metal sulfates such as double salts with organic compounds and/or basic sulfates of metals may be employed. Double salts of metal sulfate include compounds of nickel sulfate for example with varying amounts of ammonia, hydrazine, hydroxyl amine and the like may be employed. Basic sulfates which have the elements of compounds of metal sulfate and metal oxide with varying amounts of water may similarly be employed. Such compounds for example may be obtained by employing impregnation solutions containing a metal sulfate and nitrate wherein the metal nitrate is preferentially decomposed to the oxide by heating at low temperatures such as above 400° F.

While catalysts prepared by the method of this invention may be prepared which contain different percentages of the metal sulfate, those containing between about 1% and 35% and preferably between about 3% and 20% by weight are most generally employed. Although the impregnation method described hereinbefore is the preferred method, other methods may be employed such as coprecipitation, copilling and the like. Thus, a hydrous alumina gel may be mixed with an aqueous solution of nickel sulfate or other water-soluble metal sulfate for example and the mixture dried at 200° F. to 300° F. for example to obtain the finished catalyst. In other methods of preparation a hydrogel of nickel oxide or sulfide with alumina may be prepared, dried, and the adsorbent material impregnated with sulfuric acid to convert a part of the nickel to nickel sulfate for example.

The finished catalyst is useful for effecting various hydrocarbon conversion reactions such as desulfurization, denitrogenation, hydrogenation, hydroforming, reforming, cracking, destructive hydrogenation and the like. The hydrocarbon conversion may be effected at temperatures between about 500° F. and 1500° F. and preferably in the presence of hydrogen. During usage varying amounts of deposits comprising mostly carbon, nitrogen and sulfur compounds accumulate on the catalyst and are periodically removed by regeneration. Regeneration is effected by passing air diluted with flue gas, steam, nitrogen or other inert gas over the catalyst to combust the deposits while maintaining the temperature of the catalyst between 800° F. and 1050° F. The combustion is completed in the presence of undiluted air while maintaining the temperature of the catalyst between 800° F. and 1050° F. The regenerated catalyst after reduction with hydrogen has practically the same catalytic activity as the freshly prepared catalyst even after a large number of regenerations.

When the catalyst is employed for high sulfur stocks such as those containing between about 0.5% and 4.0% by weight of sulfur, there is some tendency for the catalyst to decline in activity, which decline seems to result from the slow build-up of sulfur on the catalyst. When the regeneration gases contain steam in excess of 5% and preferably in excess of 15% by volume, the rate of catalyst decline with successive regenerations is considerably lessened.

In certain cases such as when high sulfur stocks are being employed as the feed stock, water may be added to the feed to minimize sulfiding of the catalyst. Usually the added water will amount to between about 0.5 and 10 volume percent of the feed.

For the purpose of desulfurizing petroleum stocks, shale distillates and the like, the catalyst of this invention is employed under the following conditions: reaction temperatures between about 600° F. to 1000° F., pressures between about atmospheric to 5000 lbs. per sq. in. or more and at space velocities between about 0.2 and 10.0 volumes of liquid feed stock per volume of catalyst per hour, and 500 to 10,000 cu. ft. of added hydrogen per barrel of feed. The particular set of conditions is determined by the stock to be desulfurized and by the nature of the product desired.

The catalyst in this invention can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are employed: reaction temperatures between about 700° and 1000° F., pressures between about 500 and 10,000 lbs. per sq. in., feed rates between about 0.2 and 10.0 volumes of liquid feed stock per volume of catalyst per hour, and about 1,000 to 10,000 cu. ft. of added hydrogen per barrel of feed. For the removal of nitrogen it is generally desirable to employ a two-stage denitrogenation process wherein the ammonia synthesized in the first stage is removed from the first-stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalysts of this invention may also be employed for the process generally termed "hydroforming," which process serves to reform a gasoline range hydrocarbon stock and increase its aromatic content. For processing stocks for the purpose of reforming and increasing their aromaticity, the following conditions are employed: reaction temperatures between about 800° to 1200° F., pressures between about 50 to 1000 lbs. per sq. in., space velocities between about 0.2 and 4.0 volumes of liquid feed stock per volume of catalyst per hour, and about 1,000 to 10,000 cu. ft. of added hydrogen per barrel of feed. The specific conditions are determined by the nature of the specific feed stock employed and the quality of the product desired.

The catalytic compositions of this invention will in general consist essentially of a major proportion of a carrier and a minor proportion of an oxide or sulfide of molybdenum and a minor proportion of a metal sulfate. Certain compositions will optionally contain other metal oxides and sulfides in addition to the molybdenum oxide or sulfide. Such compositions may be further promoted by impregnation with inorganic halogen-containing acids.

While other compositions can be prepared generally the finished catalyst will contain between about 4% and 30% and preferably between about 6% and 12% by weight of $MoO_3$ or $MoS_2$. The additional metal oxides and/or sulfides such as those of cobalt, nickel, iron and the like are employed generally in a concentration of about 0.5% and 15% and preferably between about 1.5% and 10% by weight. The metal sulfates are generally employed in the concentration between about 0.5% and 20% and preferably in the range of about 1.5% and 10%.

When inorganic halogen-containing acids are employed as additional promoters, the catalyst normally contains between about 0.05% and 5% and preferably between about 0.2% and 3% of fluorine or chlorine. In certain cases higher concentrations may be employed if desired.

Perhaps the process of this invention is best illustrated by the following specific examples.

*Example I*

An alumina-silica gel containing an estimated 95% $Al_2O_3$ and 5% $SiO_2$ was prepared by the coprecipitation of an aqueous mixture of sodium aluminate and sodium silicate with carbon dioxide. The precipitate was washed until substantially free of sodium ions, dried at 200° to 230° F. and activated by heating for two hours at 1000° F. A solution of ammonium molybdate was prepared by dissolving about 1607 parts by weight of ammonium paramolybdate, assaying about 81% by weight of $MoO_3$, in about 1940 parts by weight of 28% aqueous ammonia and about 1550 parts by weight of distilled water. About 4400 parts by weight of the activated gel were immersed in the ammoniacal solution of ammonium molybdate, drained, dried and heated at 1100° F. for about two hours. An aqueous solution of cobalt nitrate was prepared by dissolving about 1466 parts by weight of cobalt nitrate hexa-hydrate in about 2000 parts by weight of water. The carrier supporting the molybdic oxide was then immersed in the cobalt nitrate solution, drained, dried and activated by heating to 1100° F. for two hours. The catalyst prepared by this method contained about 8.6% $MoO_3$ and 3.0% CoO.

The foregoing composition containing cobalt oxide, molybdenum oxide on the silica-alumina carrier was then divided into a series of samples each of which was impregnated with a different metal sulfate so as to produce a catalyst containing about 0.0166 mol of metal sulfate per 100 grams of catalyst. In each case the metal sulfate impregnation solution was prepared by dissolving the appropriate metal sulfate or metal sulfate hydrate thereof in distilled water in an amount calculated to give the desired concentration. Each of the catalysts was drained of excess impregnation solution after about 15 minutes of impregnation time, dried and brought to the reaction temperature. Each of the catalysts was then tested under the following reaction conditions:

| | |
|---|---|
| Temperature, °F | 900 |
| Pressure, p. s. i. | 450 |
| Process time, hours | 4 |
| Liquid hourly space velocity | 2.0 |
| Hydrogen addition, cu. ft./barrel of feed | 5000 |

For testing these catalysts gasoline stock boiling substantially in the range of between 200° F. and 400° F. obtained by distillation of a California crude was employed. The gasoline contained about 12% aromatics and had an F-1 clear octane rating of 66 which increased to 78 upon the addition of 3 ml. of tetraethyl lead fluid.

The following data were obtained on the reaction products of the several catalysts tested:

| Inorganic Sulfate | | Liquid Yield, Vol. Percent of feed | Research Octane Rating | | Gas Make, cu. ft./bbl. | |
|---|---|---|---|---|---|---|
| Formula | Weight, Percent | | Clear | Plus 3 ml. TEL | $H_2$ | $C_1$-$C_3$ |
| $CuSO_4$ | 2.62 | 97.0 | 80.5 | 93.5 | 368 | 145 |
| $NiSO_4$ | 2.51 | 96.0 | 82.5 | 94.0 | 472 | 135 |
| $BeSO_4$ | 1.71 | 94.1 | 79.0 | 91.0 | 295 | 229 |
| $FeSO_4$ | 2.46 | 94.3 | 79.5 | 92.5 | 473 | 103 |
| $Al_2(SO_4)_3$ | 6.84 | 93.3 | 79.5 | 92.5 | 22 | 315 |
| $MgSO_4$ | 2.41 | 93.2 | 79.5 | 92.5 | 267 | 107 |
| $ZnSO_4$ | 2.57 | 93.8 | 80.5 | 93.5 | 320 | 146 |
| $Na_2SO_4$ | 2.30 | 88.1 | 78.0 | 91.5 | 0 | 429 |
| $CdSO_4$ | 3.28 | 97.0 | 77.0 | 91.5 | 515 | 101 |

When the same experiment was repeated employing the cobalt oxide-molybdenum oxide catalyst without the addition of a metal sulfate, the reaction proved to be extremely exothermic to the extent that proper temperature control could not be maintained in the testing unit. A liquid recovery of about 50% by volume was obtained under these conditions. Contrastingly, each of the foregoing metal sulfate-containing catalysts catalyzed a net endothermic reaction indicative of selective dehydrogenation and less hydrocracking.

*Example II*

In another series of experiments the cobalt oxide-molybdenum oxide catalyst of Example I was impregnated with nickel sulfate to form a series of catalysts of varying $NiSO_4$ content. These catalysts were tested with the feed stock of Example I under the conditions described therein. The following data were obtained:

| $NiSO_4$, Percent by Weight | Liquid Yield, volume percent of feed | Research Octane Rating | | Gas Make, cu. ft./bbl. | |
|---|---|---|---|---|---|
| | | Clear | Plus 3 ml. TEL | $H_2$ | $C_1$-$C_3$ |
| 1.0 | Marked Hydrocracking | | | | |
| 1.55 | 90.4 | 85.0 | 96.0 | 566 | 156 |
| 2.0 | 92.5 | 84.5 | 96.0 | 650 | 128 |
| 2.5 | 95.0 | 82.5 | 94.0 | 472 | 135 |
| 3.0 | 95.3 | 78.0 | 91.5 | 382 | 93 |

*Example III*

In another series of experiments the cobalt oxide-molybdenum oxide catalyst of Example I was impregnated with cobalt sulfate to form a series of catalysts of varying $CoSO_4$ content. These catalysts were then tested with the feed stock of Example I under the conditions described therein. The following data were obtained:

| $CoSO_4$, Percent by Weight | Liquid Yield, volume percent of feed | Research Octane Rating | | Gas Make, cu. ft./bbl. | |
|---|---|---|---|---|---|
| | | Clear | Plus 3 ml. TEL | $H_2$ | $C_1$-$C_3$ |
| 0.1 | Marked Hydrocracking occurred | | | | |
| 0.5 | 89.3 | 83.0 | 94.0 | 304 | 330 |
| 1.0 | 93.7 | 76.0 | 90.0 | 218 | 146 |
| 1.5 | 96.0 | 77.5 | 92.0 | 230 | 107 |
| 2.0 | 95.3 | 76.0 | 90.0 | 263 | 112 |
| 3.0 | 97.6 | 74.5 | 89.0 | 150 | 98 |

The extreme hydrocracking activity of the cobalt oxide-molybdenum oxide catalyst is partly moderated with the impregnation of only 0.1% by weight of $CoSO_4$ and the reaction becomes endothermic and substantially a dehydrogenation reaction upon the impregnation of about 0.5 or more percent by weight of $CoSO_4$.

*Example IV*

A molybdenum oxide-alumina catalyst was prepared by immersing the alumina-silica carrier of Example I in an ammoniacal ammonium-molybdate solution prepared according to the method of Example I, draining, drying and heating at 1100° F. for about two hours.

The molybdic oxide-alumina catalyst was then reimpregnated with aqueous nickel sulfate to produce a catalyst containing 2.46% by weight of $NiSO_4$. The following data were obtained when this catalyst was compared with the corresponding molybdic oxide-alumina catalyst having no nickel sulfate under the test conditions of Example I.

| Run Number | $NiSO_4$, Percent by Weight | Liquid Yield, Vol. Percent of feed | Research Octane Rating | | Gas Make, cu. ft./bbl. | |
|---|---|---|---|---|---|---|
| | | | Clear | Plus 3 ml. TEL | $H_2$ | $C_1$-$C_3$ |
| 1 | 0.0 | 88.9 | 88.5 | 98.0 | 342 | 211 |
| 2 | 2.46 | 92.8 | 87.5 | 97.5 | 518 | 209 |
| 3 | a 2.46 | 96.4 | 87.5 | 97.0 | 588 | 230 |
| 4 | b 2.46 | 87.5 | 90.0 | 99.0 | 514 | 281 |
| 5 | c 2.46 | 92.5 | 86.0 | 96.5 | 504 | 180 |
| 6 | d 2.46 | 87.2 | 87.5 | 97.5 | 510 | 225 |
| 7 | e 2.46 | 93.7 | 81.5 | 94.5 | 372 | 131 | a Regenerated catalyst from run 2.
b Regenerated catalyst from run 3.
c Regenerated catalyst from run 4 using 4.0 space velocity.
d Regenerated catalyst from run 5 using 4.0 space velocity.
e Regenerated catalyst from run 6 using 6.0 space velocity.

*Example V*

The molybdic oxide-alumina catalyst of Example IV was impregnated with 6.0% by weight of $CoSO_4$ and when tested according to the method described in Example I the following data were obtained:

| $CoSO_4$, Percent by Weight | Liquid Yield, volume percent of feed | Research Octane Rating | | Gas Make, cu. ft./bbl. | |
|---|---|---|---|---|---|
| | | Clear | Plus 3 ml. TEL | $H_2$ | $C_1$-$C_3$ |
| 0.0 | 88.9 | 88.5 | 98.0 | 342 | 211 |
| 6.0 | 92.2 | 79.5 | 92.5 | 366 | 101 |

*Example VI*

Another series of experiments were designed to test the effect of nickel sulfate and nickel oxide on the molybdic oxide-alumina catalyst of Example IV. The catalyst of Example IV was impregnated with nickel nitrate according to the general method of Example I for the deposition of CoO on molybdic oxide-alumina. The nickel oxide-molybdic oxide-alumina catalyst was impregnated with nickel sulfate employing aqueous nickel sulfate as in the methods described hereinbefore. When the catalyst was tested according to the procedure of Example I, the following data were obtained:

| NiO Percent by Weight | NiSO$_4$, Percent by Weight | Liquid Yield, Vol. Percent of feed | Research Octane Rating | | Gas Make cu. ft./bbl. | |
|---|---|---|---|---|---|---|
| | | | Clear | Plus 3 Ml. TEL | H$_2$ | C$_1$–C$_3$ |
| 3.0 | 3.0 | 91.3 | 86.0 | 96.5 | 535 | 221 |

*Example VII*

An ammoniacal ammonium molybdate solution is poured into a solution of aluminum nitrate causing the precipitation of a mixed hydrogel of alumina and molybdic oxide. The hydrogel contains about 10% by weight of MoO$_3$ on an anhydrous basis. The hydrogel is filtered, washed by resuspension of the precipitate in distilled water, dried and crushed to form granules. The dried hydrogel is heated to about 300° F. to render it sufficiently adsorptive for impregnation. A portion of the granules was immersed in a 2% aqueous solution of sulfuric acid, drained and again dried at 300° F. When the two catalysts, the one impregnated with sulfuric acid and the other unsulfated, are compared under the test conditions of Example I it is found that the sulfated catalyst is more selective for dehydrogenation and gives a higher liquid recovery.

*Example VIII*

The dried mixed hydrogel of malybdic oxide and the alumina of Example VII is impregnated with a 5% by weight solution of cupric sulfate. The finished catalyst contains about 2.2% by weight of copper sulfate and when tested under the conditions of Example I is found to be more selective for dehydrogenation than is the corresponding molybdena alumina without impregnation with copper sulfate.

*Example IX*

In another series of experiments the nickel sulfate-molybdenum oxide-alumina catalyst of Example IV and the nickel oxide-nickel sulfate-molybdenum oxide-alumina catalyst of Example VI were separately impregnated by immersion in a 2% solution of hydrofluoric acid. After draining, drying at 300° F. and testing under the conditions of Example I, it is found that the added hydrofluoric acid improves the liquid product in each case. Similar results are obtained when the copper sulfate-cobalt oxide-molybdenum oxide-alumina catalyst of Example I is impregnated with a 5% solution of hydrochloric acid.

*Example X*

A molybdenum sulfide catalyst is prepared by impregnating the silica-alumina carrier of Example I with an ammoniacal solution containing 2% ammonium sulfide and 10% by weight of ammonium paramolybdate (81% MoO$_3$). After draining and drying at 300° F. in a nitrogen atmosphere the molybdenum sulfide-alumina-silica catalyst is impregnated by immersion in a 4.5% by weight aqueous solution of cobalt sulfate. The catalyst containing the cobalt sulfate is superior to a corresponding catalyst prepared substituting cobalt nitrate for the cobalt sulfate when the two are tested under the conditions of Example I.

In broad aspect this invention relates to a new catalyst for the catalytic conversion of hydrocarbon stocks in the presence of hydrogen. The molybdenum catalysts of this invention which are promoted with metallic sulfates have good stability and show high activity for the desired reactions with low activity for reactions producing carbon and low boiling hydrocarbon gases such as methane. The molybdenum catalysts may employ molybdenum sulfides or oxides with or without other metal oxides. Such catalysts may be promoted by inclusion of inorganic halogen containing acids by impregnation so as to improve additionally the character of the products obtained. This application is a division of copending application Serial No. 235,579, filed July 6, 1951, now U. S. Patent No. 2,748,062.

The foregoing disclosure of this invention is not to be considered as limiting since many variations may be made by those skilled in the art without departing from the spirit or scope of the following claims.

I claim:

1. A hydrocarbon conversion catalyst consisting essentially of a major proportion of an adsorbent oxide carrier and intimately distributed therein between about 4% and 30% by weight of molybdenum oxide, and between about 0.5% and 20% by weight of nickel sulfate.

2. A catalyst as defined in claim 1 wherein said carrier is essentially activated alumina.

3. A catalyst as defined in claim 1 wherein said carrier is an intimate mixture of 85% to 99% alumina gel and 1% to 15% silica gel by weight.

References Cited in the file of this patent

UNITED STATES PATENTS

| 2,122,787 | Tropsch | July 5, 1938 |
| 2,206,377 | Weiss | July 2, 1940 |
| 2,692,259 | Peters | Oct. 19, 1954 |
| 2,732,329 | Doumani | Jan. 24, 1956 |

FOREIGN PATENTS

| 643,862 | Great Britain | Sept. 27, 1950 |